No. 854,936. PATENTED MAY 28, 1907.
S. R. DRESSER.
COUPLING FOR BELL AND SPIGOT PIPES.
APPLICATION FILED SEPT. 5, 1905.
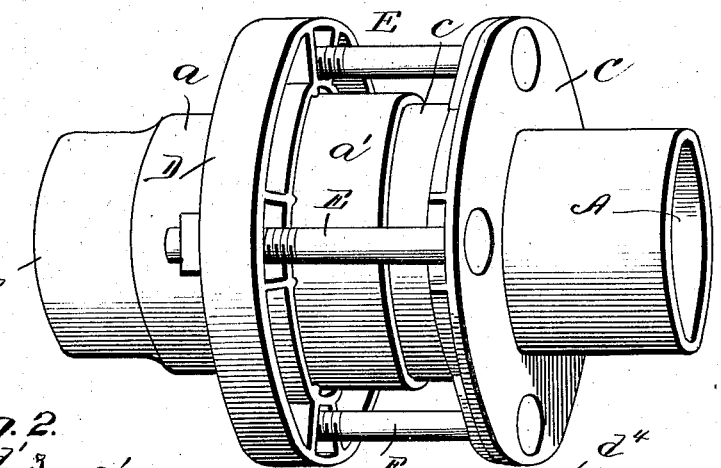
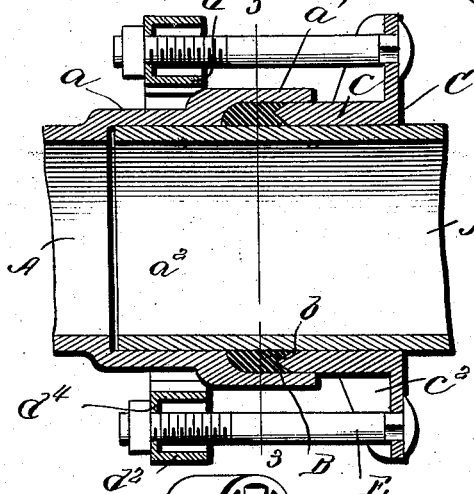
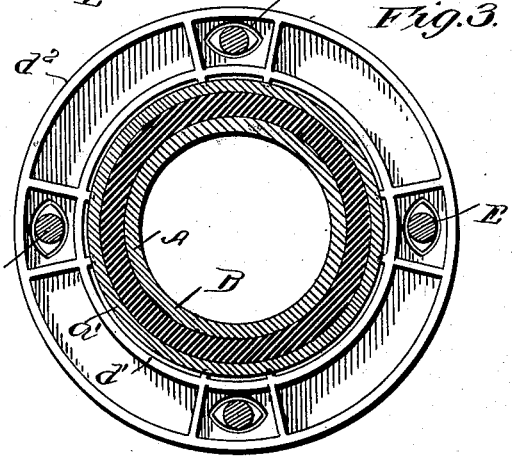
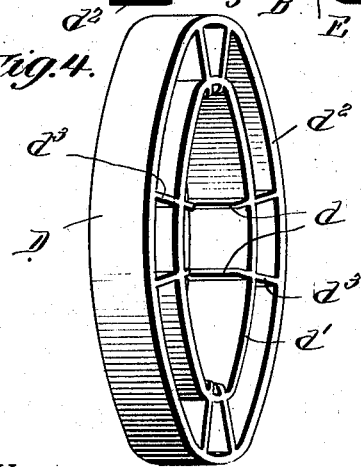
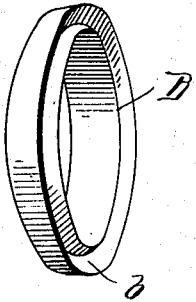
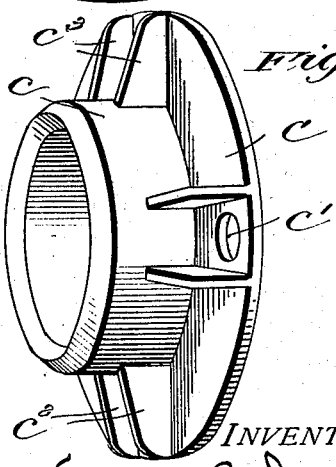
WITNESSES:
INVENTOR
Solomon R. Dresser
BY Whitaker Prevost
Attorneys.

UNITED STATES PATENT OFFICE.

SOLOMON R. DRESSER, OF BRADFORD, PENNSYLVANIA, ASSIGNOR TO S. R. DRESSER MANUFACTURING COMPANY, OF BRADFORD, PENNSYLVANIA, A CORPORATION OF PENNSYLVANIA.

COUPLING FOR BELL AND SPIGOT PIPES.

No. 854,936.        Specification of Letters Patent.        Patented May 28, 1907.

Application filed September 5, 1905. Serial No. 277,075.

*To all whom it may concern:*

Be it known that I, SOLOMON R. DRESSER, a citizen of the United States, residing at Bradford, in the county of McKean and State of Pennsylvania, have invented certain new and useful Improvements in Couplings for Bell and Spigot Pipes; and I do hereby declare the following to be a full, clear, and exact description of the invention, such as will enable others skilled in the art to which it appertains to make and use the same.

My present invention consists in the novel features hereinafter described, reference being had to the accompanying drawing which illustrates one form in which I have contemplated embodying the invention and said invention is fully disclosed in the following description and claims.

The object of my present invention is to provide a non-leakable joint for bell and spigot pipe in which no machine work on the pipe itself is necessary.

The coupling herein shown and described is especially designed for a type of cast iron bell and spigot pipe known as "Dresser special cast iron pipe" in which the "bell" end of each pipe section is provided with two successive bells, the outer bell being of greater diameter than the inner bell. The smaller or inner bell is adapted to receive the spigot end of an adjacent pipe section, and the larger bell is constructed to receive a packing ring between it and the said spigot, said ring being provided with an annular groove V-shaped in cross section, which is engaged by a V-shaped end portion of a sleeve or follower, provided with a clamping ring or plate, surrounding the spigot end of the adjacent pipe section. A second clamping ring surrounds the exterior of one of the bells, preferably the outer or larger bell and the internal periphery of said ring is provided with inwardly projecting lugs, or webs, which engage the bell at a number of separated points, and distribute the strain of the bolts more equably than would be the case where the ring itself is brought into direct contact with the bell. Clamping bolts connect the clamping rings or plates and when tightened press the V shaped end of the follower into the recess of the packing ring, forcing the ring to the bottom of the outer bell, and spreading the ring so as to force it into tight engagement with the outer surface of the spigot and the inner surface of the outer bell, thus making a tight joint.

It is to be noted that no special work is required upon either end of the pipe sections and this pipe can be manufactured at the same price as any other bell and spigot pipe, while the coupling produces therewith a very tight and satisfactory joint.

My invention also includes certain details of construction hereinafter fully set forth.

In the drawings which accompany and form part of this specification, Figure 1 represents a perspective view of my improved coupling applied to the bell and spigot of two pipe sections. Fig. 2 is a vertical longitudinal sectional view of the same. Fig 3 is a transverse vertical section on line 3—3 of Fig. 2. Figs. 4 and 5 are views of the two clamping rings. Fig. 6 is a detail view of the rubber packing ring.

A, A represent the two pipe sections to be connected, of which are shown, the bell end of one section and the spigot end of the other, it being understood that all of the pipe sections are of the same form. The section at the left in the drawing is shown as provided with a bell $a$ and a larger bell $a'$, the bell $a$ receiving the spigot end $a^2$ of the adjacent section, while the bell $a'$ being of greater diameter, affords a packing recess in which is placed a packing ring B preferably of rubber.

It is to be noted that the inner surface of the outer bell $a'$ curves outward sharply from the outer surface of the spigot, so that the inner end or bottom of the packing recess is practically perpendicular to the inner wall of the inner bell at its junction therewith, and to the spigot. The rubber packing ring is molded to fit the space between the outer bell and the spigot of the adjacent pipe section, and the curved bottom of the so formed packing recess. The conformation of the outer bell, thus securely holds the packing ring and prevents it from being squeezed into the narrow space between the spigot and the wall of the inner end, which would tend to crush and bruise the rubber and deprive it of its elasticity.

The ring B has a central hole to receive the spigot end of the pipe and is curved on its outer surface (as at $b'$) to fit the inner end of the bell. On its front face it is provided with an annular groove $b$, V-shaped in cross section. The ring B is illustrated in detail in Fig. 6.

The follower comprises a clamping ring C adapted to surround the spigot end of a pipe section and provided with an annular flange or sleeve $c$ projecting from the ring on one side, and adapted to pass into the packing recess of the bell $a'$. The outer edge of the flange $c$ is V-shaped in cross section to fit into the V-shaped groove or recess $b$ of the packing ring B as shown in Fig. 2. The ring C is provided with a plurality of bolt holes $c'$ preferably oval in form to fit oval portions formed on the bolts E beneath the heads of the same, to prevent the bolts from turning when the nuts are being screwed up, and the ring C is also provided with transversely or radially disposed reinforcing webs or flanges $c^2$ $c^2$ connecting the ring proper and annular flange $c$ to give the construction great strength with the minimum of weight. These webs are preferably arranged in pairs and the bolt holes are conveniently arranged between the said pairs so that the ring is reinforced at the points of greatest strain.

D represents another clamping ring which engages the exterior of the bell $a'$ of the pipe section, and is provided on its interior with a plurality of projecting webs or studs $d$ which directly engage the exterior of the bell. These lugs perform a very important function. Owing to the irregularities in the surface of the bell and clamping ring, if these lugs were omitted it would be almost impossible to secure a proper or uniform distribution of the strain of the bolts around the bell, between it and the flange D, which would tend to cause the flange or bell, or both, to crack. By employing these lugs the clamping ring D can readily be placed so that all of these lugs will contact with the exterior of the bell, notwithstanding any inequalities of the adjacent surfaces and thus the strain of the bolts, which is exerted substantially in line with these lugs, is equally distributed. The ring D is provided with a central aperture which surrounds the bell $a$, and on its rear face is provided with inner and outer annular reinforcing flanges $d'$ $d^2$. The flanges $d'$ $d^2$ are connected by transverse or radial webs $d^3$ $d^3$ arranged in pairs around the ring. The ring D is also provided with a plurality of oval bolt holes $d^4$ arranged preferably between the said pairs of webs $d^3$, and corresponding with the bolt holes in the ring C. As both rings are provided with the oval shaped holes, the bolts may be inserted from either end of the coupling.

I also prefer that the bell engaging webs or lugs $d$ $d$ shall be arranged in line with the webs $d^3$ $d^3$ and form continuations thereof as shown in order to give the greatest strength.

In assembling the parts, the ring D is slipped over one pipe section and moved up until the bell engaging webs $a$ $a$ are brought into contact with the exterior of the bell $a'$ and the ring C is placed on the spigot end of the next adjacent pipe section. A packing ring B is then placed on the said spigot, and the spigot is inserted in the bell $a$ of the adjacent pipe section. The rubber packing ring B is forced into the bell $a'$ or packing recess, and the clamping ring C is moved up to force the annular flange $c$ thereof into the bell $a'$ and into engagement with the packing ring B. The bolts E are now inserted and the nuts thereon drawn up so as to force the annular flange $c$ of the ring C firmly against the packing ring thus compressing it and making a tight joint between the bell $a'$ and the spigot of the adjacent pipe section.

It will be seen that when the follower is forced toward the bell, the flange $c$ of the follower will enter the packing recess, and compress the packing ring in a direction longitudinally of the pipe section, throughout its entire mass, thus compacting the ring and causing it to expand transversely and press laterally with great, but elastic, pressure against the exterior surface of the spigot and the interior surface of the outer bell $a'$. Owing to the fact that the bottom of the packing recess, so formed, is substantially perpendicular to the spigot, adjacent thereto, the rubber ring is prevented from being squeezed and mutilated between the spigot and the interior of the small bell $a$ and thus the mass or body of the rubber is uniformly compacted and maintained in a state of uniform compression, which tends to preserve the life of the rubber and insure more perfectly the tightness of the joint. It is also to be noted that the wedge shaped end of the annular flange $c$ of the follower entering the annular groove of the packing ring, also tends to compress the lateral portions of the rubber on the inner and outer sides of this groove against the bell $a'$ and the spigot $a^3$ and effectually seals the packing ring within the packing recess.

What I claim and desire to secure by Letters Patent is:—

1. In a pipe coupling for bell and spigot pipe, the combination with the packing ring, of a clamping ring adapted to fit over the spigot and provided with means for engaging and compressing the packing ring, a second clamping ring adapted to surround the bell, having its interior surface provided with separated, inwardly extending bearing lugs for directly engaging the exterior of the bell to distribute the strain of said bolts around said ring and bell and clamping bolts connecting said clamping rings, substantially as described.

2. In a pipe coupling for bell and spigot pipe, the combination with the packing ring, of a clamping ring adapted to fit over the spigot and provided with means for engaging and compressing the packing ring, a second clamping ring adapted to surround the bell, having its interior surface provided with separated, inwardly extending bearing lugs for directly engaging the exterior of the bell to distribute the strain of said bolts around said ring and bell, said bearing lugs being arranged closely adjacent to those portions of the ring through which the bolts pass, for transmitting the strain of the bolts directly to the bell and bolts connecting said clamping rings, substantially as described.

3. In a pipe coupling for bell and spigot pipe, the combination with the packing ring, of a clamping ring adapted to fit over the spigot and provided with means for engaging and compressing the packing ring, a second clamping ring adapted to surround the bell, having its interior surface provided with separated, inwardly extending bearing lugs for directly engaging the exterior of the bell to distribute the strain of said bolts around said ring and bell, said second clamping ring being provided with bolt holes and said bearing lugs being arranged in pairs, and the lugs of each pair being located on opposite sides of one of the said bolt holes, and clamping bolts passing through said bolt holes and connecting said clamping rings, substantially as described.

4. In a pipe coupling for bell and spigot pipe, the combination with the packing ring, of a clamping ring adapted to fit over the spigot and provided with means for engaging and compressing the packing ring, a second clamping ring adapted to surround the bell, provided on its inner face with inner and outer annular flanges, and reinforcing webs connecting said flanges at intervals and having its interior surface provided with separated, inwardly extending bearing lugs in line with said webs for directly engaging the exterior of the bell to distribute the strain of the bolts around said ring and bell and bolts connecting said clamping rings, substantially as described.

5. In a pipe coupling for bell and spigot pipe, the combination with the packing ring, of a clamping ring adapted to fit over the spigot and provided with means for engaging and compressing the packing ring, a second clamping ring adapted to surround the bell provided on its inner face with concentric annular flanges, and reinforcing webs disposed substantially radially, arranged in pairs around the ring and connecting said concentric flanges, the ring proper being provided with bolt holes between said webs, the inner annular flange being provided on its interior face, with separated bearing lugs for directly engaging the bell, to distribute the strain of the bolts around said ring and bell, each of said lugs being in line with one of said reinforcing webs, and bolts connecting said clamping rings, substantially as described.

6. In a pipe coupling, the combination with the packing ring, of a clamping ring adapted to fit over the pipe, and provided with a laterally extending sleeve for engaging the packing ring, and reinforcing webs connecting said ring and sleeve, and arranged in pairs around the sleeve, said ring being provided with bolt holes between the webs of said pairs, and clamping bolts extending through said bolt holes, substantially as described.

7. The combination with two pipe sections, having their adjacent ends provided, the one with two successive bells, the outer bell being of greater diameter than the inner, and the other with a spigot adapted to fit within the inner bell, and form a packing recess between the spigot and the outer bell, a packing ring fitting in said recess, and provided on its outer face with an annular groove, a clamping ring surrounding said spigot, and provided with a laterally extending sleeve, to engage said groove, and having reinforcing webs, connecting said sleeve and ring and arranged in pairs around the ring, the ring being provided with bolt holes each located between a pair of said webs, a second clamping ring surrounding one of said bells and bolts connecting said clamping rings, substantially as described.

8. The combination with two pipe sections, having their adjacent ends provided, the one with two successive bells, the outer bell being of greater diameter than the inner, and the other with a spigot adapted to fit within the inner bell, and form a packing recess between the spigot and the outer bell, a packing ring fitting in said recess, and provided on its outer face with an annular groove, a clamping ring surrounding said spigot, and provided with a laterally extending sleeve, to engage said groove, and having reinforcing webs, connecting said sleeve and ring and arranged in pairs around the ring, the ring being provided with bolt holes each located between a pair of said webs, a second clamping ring surrounding the outer bell, and having its interior face provided with separated, inwardly extending bearing lugs directly engaging the outer surface of said outer bell for distributing the strain of the bolts around said ring and bell, and bolts connecting said clamping rings, substantially as described.

In testimony whereof I affix my signature, in the presence of two witnesses.

SOLOMON R. DRESSER.

Witnesses:
C. C. COMFORT,
JASPER M. DRESSER.